(12) United States Patent
Rajala et al.

(10) Patent No.: US 6,205,576 B1
(45) Date of Patent: Mar. 20, 2001

(54) METHOD AND APPARATUS FOR IDENTIFYING INDIRECT MESSAGING RELATIONSHIPS BETWEEN SOFTWARE ENTITIES

(75) Inventors: Norman Rajala; Djenana Campara, both of Nepean (CA); Nikolai Mansurov, Moscow (RU)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/090,954

(22) Filed: Jun. 5, 1998

(51) Int. Cl.[7] .................................................. G06F 9/45
(52) U.S. Cl. ........................ 717/3; 717/4; 707/1
(58) Field of Search .................. 395/703, 701, 395/200.64; 709/200, 222, 303, 234; 710/65; 717/3, 1; 707/1

(56) References Cited

U.S. PATENT DOCUMENTS

| | | | |
|---|---|---|---|
| 4,455,619 | 6/1984 | Masui et al. | 345/509 |
| 4,694,396 | * 9/1987 | Weisshaar et al. | 709/313 |
| 4,718,005 | * 1/1988 | Feigenbaum et al. | 709/222 |
| 4,885,717 | 12/1989 | Beck et al. | 717/4 |
| 5,187,788 | 2/1993 | Marmelstein | 717/3 |
| 5,191,646 | 3/1993 | Naito et al. | 345/349 |
| 5,261,080 | * 11/1993 | Khoyi et al. | 710/65 |
| 5,442,738 | 8/1995 | Chapman et al. | 345/435 |
| 5,513,305 | 4/1996 | Maghbouleh | 707/500 |
| 5,539,909 | * 7/1996 | Tanaka et al. | 709/315 |
| 5,592,600 | 1/1997 | De Pauw et al. | 345/400 |
| 5,794,041 | * 8/1998 | Law et al. | 717/1 |
| 5,867,664 | * 2/1999 | Kosugi et al. | 710/56 |

FOREIGN PATENT DOCUMENTS 2144483    10/1995    (CA) .............................. G06F/17/00

* cited by examiner

Primary Examiner—Mark R. Powell
Assistant Examiner—Hoang-Vu Antony Nguyen-Ba

(57) ABSTRACT

A system and method for identifying indirect messaging relationships between software entities. Within a source code repository, all occurrences of calls to interface functions are identified together with communications objects to which these calls pertain. Each interface function call is categorized as either a "send" or a "receive" interface function call. A relationship is identified when a pair of interface function calls are located which pertain to the same communications object and one of the pair has a "send" type and the other of the pair has a "receive" type. By identifying pairs of this type, relationships between hierarchical software entities which contain the interface function calls are also simultaneously identified.

14 Claims, 13 Drawing Sheets

60 {
| | | |
|---|---|---|
| as_asent | 1 s | signal |
| as_catch | 0 r | signal |
| as_send | 1 r | signal |
| | | |
| ev_asend | 1 s | event |
| ev_receive | 0 r | event |
| ev_send | 1 s | event |
| | | |
| q_asend | 1 s | queue |
| q_aurgent | 1 s | queue |
| q_avsend | 1 s | queue |
| q_avurgent | 1 s | queue |
| q_broadcast | 1 s | queue |
| q_create | 4 o | queue |
| q_delete | 1 o | queue |
| q_receive | 1 r | queue |
| q_send | 1 s | queue |
| q_urgent | 1 s | queue |
| q_vbroadcast | 1 s | queue |
| q_vcreate | 5 o | queue |
| q_vdelete | 1 o | queue |
| q_vreceive | 1 r | queue |
| q_vsend | 1 s | queue |
| q_vurgent | 1 s | queue |
| | | |
| sm_av | 1 r | sema |
| sm_create | 4 r | sema |
| sm_delete | 1 o | sema |
| sm_p | 1 s | sema |
| sm_v | 1 r | sema |

62 {
| | | |
|---|---|---|
| IpcRegMsg | 0 r | ipc |
| IpcTxDataMsg | 2 s | ipc |

FIG. 9

METHOD AND APPARATUS FOR IDENTIFYING INDIRECT MESSAGING RELATIONSHIPS BETWEEN SOFTWARE ENTITIES

FIELD OF THE INVENTION

The invention relates to systems and methods for reverse engineering software, and more particularly relates to a method and apparatus for identifying indirect messaging relationships between software entities.

BACKGROUND OF THE INVENTION

There are many tools available today which are capable of producing various types of graphical representations of source code. These include for example call charts which graphically illustrate which software functions call which other software functions, and dataflow diagrams which show the direct flow of data between software functions.

Existing tools are generally only capable of capturing relationships between software entities which are very direct such as the above-identified call and dataflow relationships. In many real time systems, there is operating system (OS) or application layer (AL) involvement in the exchange of data between software entities which tends to obscure the actual nature of the relationship between these entities. Messaging relationships are often examples of such obscured relationships. When a first entity sends a message to a second entity, there is usually no direct function call flow from the first entity to the second entity. Rather, the first entity writes the message by calling an OS or AL service, and this results in a number of OS or AL functions being run to enact the writing of the message. Then, the second entity reads the message by calling another OS or AL service, and this in turn results in a number of OS or AL functions being run to enact the reading of the message. Even while there is clearly a definite relationship between the first and second entity, existing tools are unable to detect or capture this in any meaningful way. This is firstly due to the fact that most of the time OS and AL source code is not available for analysis. This is due secondly to the fact that even if it were possible to use existing tools to view the source code of the OS and AL functions being called, at the highest level of granularity the call flows on either side (read and write) in most cases would not meet. For those cases where they do meet, the hierarchy of OS and AL calls would make it difficult to identify the real nature of the relationship, namely that of a message being passed from the first entity to the second entity.

SUMMARY OF THE INVENTION

It is an object of the invention to obviate or mitigate one or more of the above identified disadvantages.

The invention provides systems and methods for extracting relationships between software entities in a manner which hides uninteresting application software and operating system calls.

According to a first broad aspect, the invention provides a method to be performed on or with the aid of one or more processors for identifying indirect messaging relationships between software entities in source code comprising the steps of: identifying all constructs within the source code which are interface function calls and storing each of these in a record in an indirect messaging table, and including in each record a respective communications object identifier used in the respective interface function call; identifying all pairs of records in the indirect messaging table consisting of a first record relating to a "send" type interface function call and a second record relating to a "receive" type interface function call with both the first and second records containing the same communications object identifier.

According to a second broad aspect, the invention provides an apparatus comprising: means for reading source code files; memory means for storing an indirect messaging table and indirect messaging relationships table; means for identifying all constructs within the source code which are interface function calls and storing each of these in a record in the indirect messaging table, and including in each record a respective communications object identifier used in the respective interface function call; and means for identifying all pairs of records in the indirect messaging table consisting of a first record relating to a "send" type interface function call and a second record relating to a "receive" type interface function call with both the first and second records containing the same communications object identifier and storing for each pair a record in the indirect messaging relationships table.

BRIEF DESCRIPTION OF THE DRAWINGS

Preferred embodiments of the invention will now be described with reference to the attached drawings in which:

FIG. 9 is an interface definition file used by the RDT of FIG. 3 in conjunction with source code written in the "C" language in a pSOS operating system environment.

DETAILED DESCRIPTION OF THE PREFERRED EMBODIMENTS

Figure 1A:
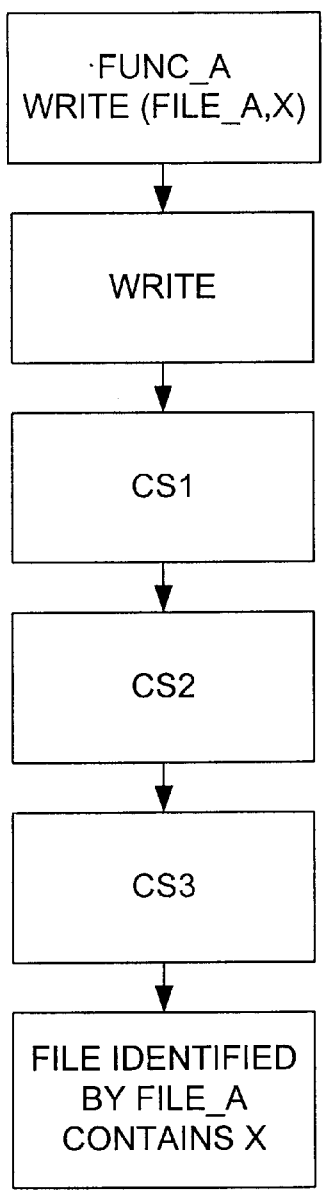
FIGS. 1A and 1B are conventional call charts for a file write and a file read.
Figure 1B:
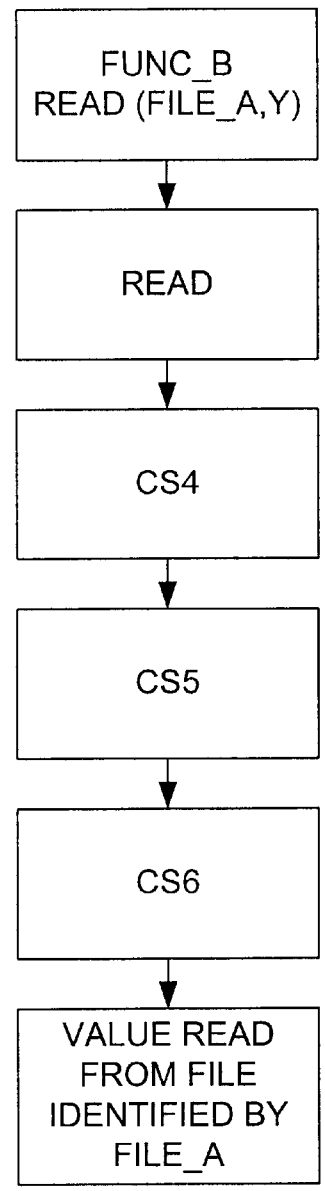

Referring firstly to FIGS. 1A and 1B, two call charts for a messaging relationship which conventional tools are incapable of detecting or capturing are shown. In FIG. 1A, a function Func_A contains source code calling a function which writes a value in a local variable X to a file identified by a global variable File_A. This source code might consist of the following statement:

Write(File_A,X).

In the process of writing X to the file identified by File_A, the function "Write" calls a series of operating system functions CS1, CS2, CS3 at the end of which the file identified by File_A ends up containing the value in local variable X. In FIG. 1B, a function Func_B contains source code calling a function which reads a value from a file identified by the global variable File_A and puts this value into a local variable Y. This source code might consist of the following statement:

Read(File_A,Y).

Figure 1C:
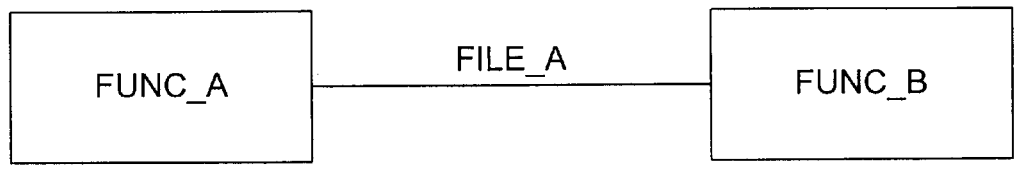
FIG. 1C is an indirect messaging relationship diagram abstracting and combining the call charts of FIGS. 1A and 1B.

In the process of reading Y from the file identified by File_A, the function "Read" calls a series of operating system functions CS4, CS5, CS6 at the end of which local variable Y contains a value read from the file identified by File_A. There is an indirect messaging relationship between Func_A and Func_B since Func_A writes to the file identified by File_A, and Func_B reads from the same file. However, it is not commonplace for the source code of the OS functions (CS1, CS2, CS3, CS4, CS5, CS6 in this example) to be available and as such it is not normally possible to generate call charts such as those of FIGS. 1A and 1B. Even if it were possible, the call chart of the write operation never meets the call chart of the read operation. This and the complexity of the call charts obscures the fact that Func_A is really communicating with Func_B. Embodiments of the invention provide systems and methods for abstracting such indirect messaging relationships by hiding all of the uninteresting OS function calls, and by hiding the indirectness of the relationships to produce relationships such as shown diagramatically in FIG. 1C. In FIG. 1C, it has been made explicitly clear that Func_A communicates with Func_B through File_A.

Figure 2:
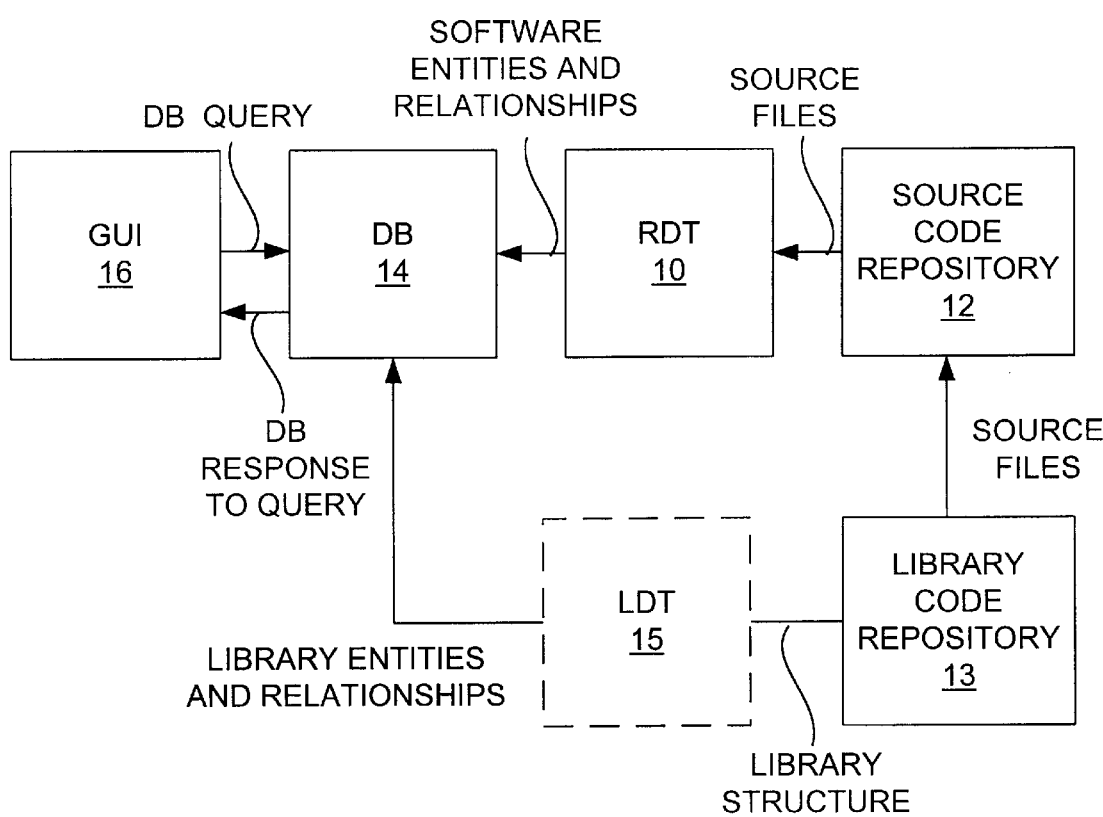
FIG. 2 is a block diagram of a system including a relationship definition tool (RDT) according to an embodiment of the invention.

Referring now to FIG. 2, an RDT (relationship definition tool) according to an embodiment of the invention is generally indicated by 10 and is deployed as part of a system which includes a source code repository 12 (also referred to as a load), a library code repository 13, the RDT 10, a database 14, and a GUI (graphical user interface) 16. The RDT 10 is a software application capable of analysing source code contained in source files stored in the source code repository 12, and extracting software entities and their relationships within the source code, and storing them in ASCII tables which may for example be output for storage in the database 14.

Figure 3:
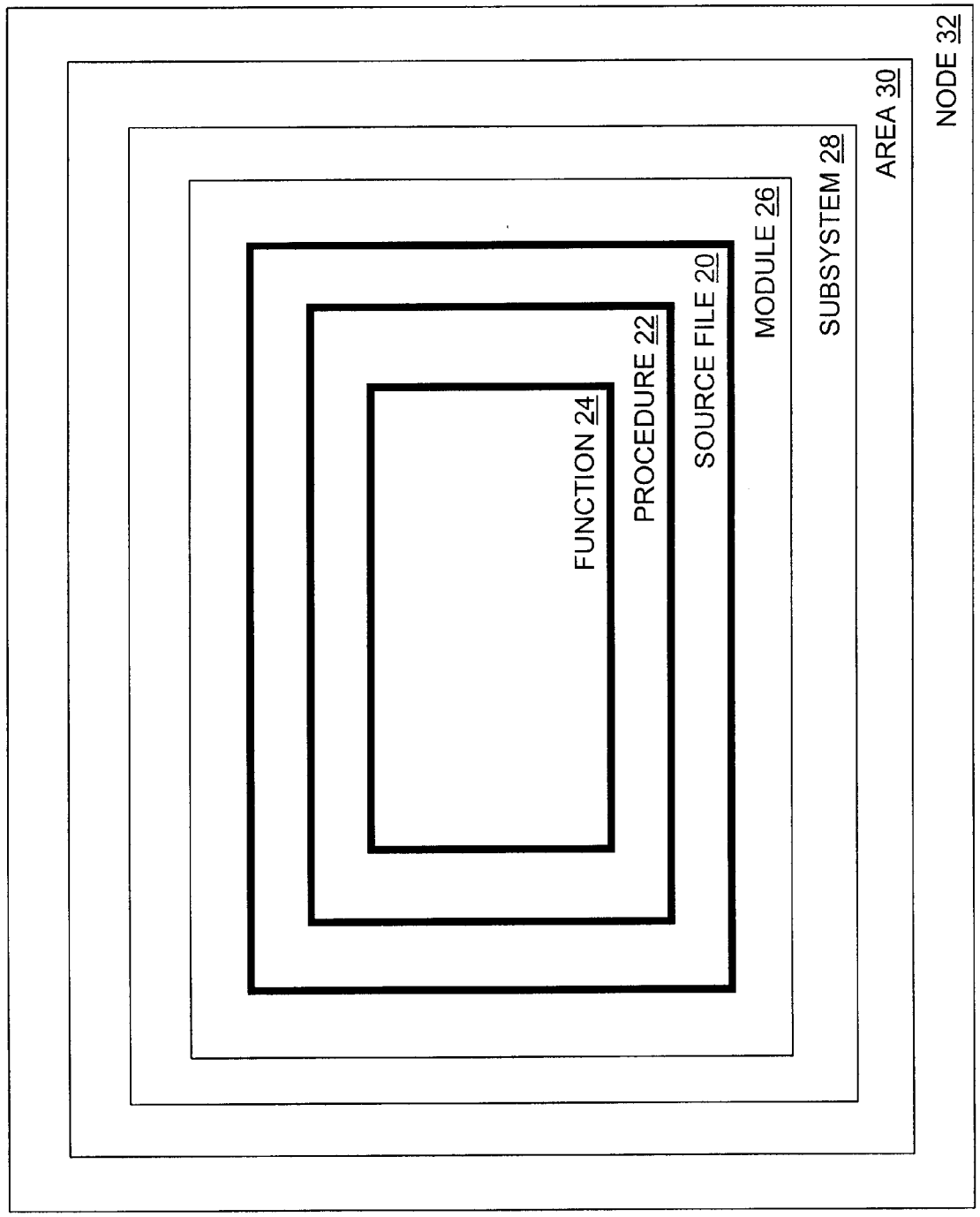
FIG. 3 is an example level hierarchy.

The source code repository 12 contains the source code to be analysed by the RDT 10 and may be implemented using any known code storage mechanism. The source code repository contains a "physical hierarchy" of software entities. Source files, procedures functions and variables, for example are referred to as physical software entities because they actually exist and take up storage space. An example physical hierarchy is shown in FIG. 3 where physical containment is shown by bold boxes 20,22,24 and it is assumed that the largest physical software entity in the source code repository is a source file 20. A source file 20 may contain one or more defined procedures 22, which may contain one or more functions calls 24.

The library code repository 13 is where the source code is backed up and version controlled. These types of repositories are used with most software developments to provide a formal method of tracking and reproducing version controlled software loads. The source code repository 12 contains selected versions of the code stored in the library code repository 13. The library code repository 13 also plays a role in software partitioning, providing a logical hierarchy of software entities. An example logical hierarchy is also shown in FIG. 3 where logical containment is shown by boxes 26,28,30 and it is assumed that the smallest logical entity is a module 26, this being a logical grouping of one or more source files. A subsystem 28 is a logical grouping of one or more modules 26, an area 30 is a logical grouping of one or more subsystems 28, and a node 32 is a logical grouping of one or more areas 30. Modules, subsystems, areas and nodes are referred to as logical entities. Logical entities are defined by groupings rather than by the physical contents of the groupings. The library structure's logical hierarchy is available to the database 14 in the form of library entities and their relationships. Depending upon the nature of the library code repository 13, an LDT (library definition tool) 15 (see FIG. 2, shown in phantom) may be provided for analysing the library structure of the library code repository and extracting library entities and relationships.

It is noted that other than the RDT 10 and the source code repository 12, all remaining features of FIG. 2 are to be considered optional. For systems which do not employ a logical hierarchy defined within a library code repository 13, only the physical hierarchy defined in the source code repository 12 would be used. Furthermore, the ASCII tables produced by the RDT 10 are useful in their own right and as such the database 14 and GUI 16 are not necessary for some applications.

When present, the database 14 may be any off-the shelf commercial database or may be a custom database, and is preferably a relational database. When present, the GUI 16 includes functionality for a user to generate queries to the database 14, functionality to receive the response to such queries from the database, and functionality for producing various forms of graphical output on the basis of these results. It is to be understood that while the RDT 10, database 14 and GUI 16 may each be implemented on a respective processing platform, two or more of these functions may be implemented on the same processing platform.

Figure 4:
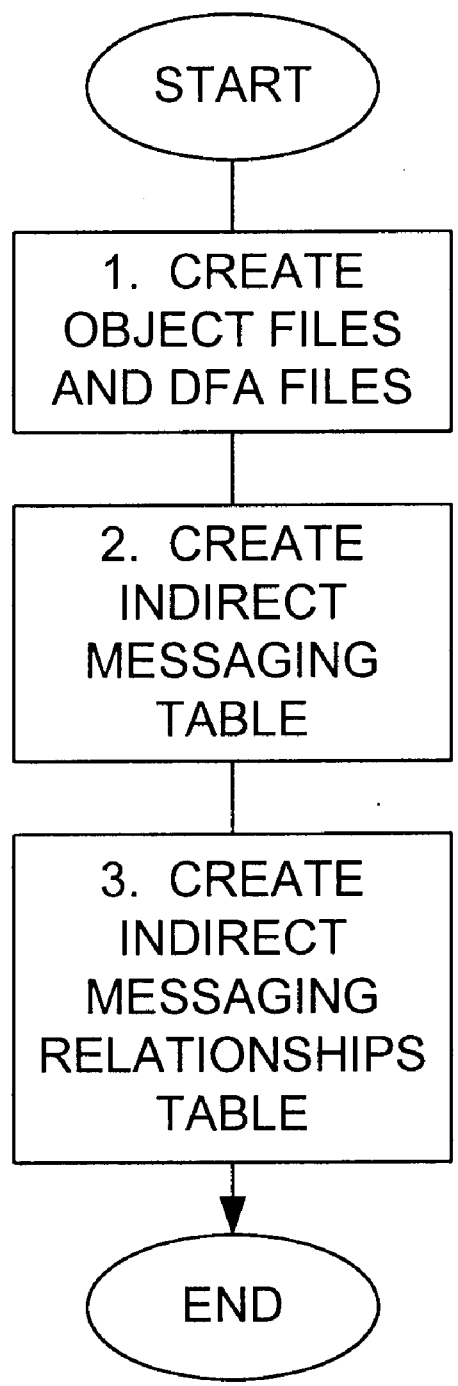
FIG. 4 is a top-level flowchart for a method implemented by the relationship definition tool of FIG. 3.

A very high level flowchart for the functionality implemented by the RDT 10 of FIG. 2 is shown in, FIG. 4. The steps in this flowchart will be described briefly by way of overview, and then each step will be described in detail. Step one is to create an object file and a DFA (data flow analysis) file for each source file stored in the source code repository. Step two is to create an indirect messaging table which contains a list of all function calls which are interface function calls. Step three is to create an indirect messaging relationships table by identifying all pairs of records in the indirect messaging table consisting of a first record relating to performing a "send" interface function on a communications object, and a second record relating to performing a "receive" interface function on the same communications object.

In the detailed description of the three steps appearing in the flowchart of FIG. 4 which follows, it is assumed that all indirect messaging is achieved through communications objects which are ultimately associated with global entities, and that these global entities are permanently and exclusively associated with the communications objects they identify. Communications objects may be directly associated with global entities such as global variables, global array elements, etc. Alternatively, the association may be a "complex" association in the sense that the communications object is directly associated with some local entity which is ultimately assigned to equal one or more global entities. In this case, it is the one or more global entities ultimately used in place of the local entity which satisfy the constraint that all communications are ultimately associated with global entities.

The symbolic names of these global entities will be referred to as communications object identifiers, or COIDs.

It is also assumed that these global entities are single assignment global entities. That is to say, they are assigned a value once at some point during the execution of the software, and are not reassigned. This results in the assumptions that wherever a particular symbolic name appears, during run time the same physical communications object would be referenced, and that whenever different symbolic names appear, during run time different physical communications objects are being referenced. Finally, it is also assumed that in the source code, the same global entity (and as such the same communications object) is used in both a receive type interface function call and a send type interface function call. Interface functions and their types (receive and send among others) are described in further detail below.

Step One: Create Object Files and DFA Files

An object file is a file generated for each source file which contains a record for each construct which uses at least one global entity, these constructs including basic code entities within the source file, and including basic relationships within the source file. The basic code entities for example include file definitions, variable definitions, type definitions, function definitions and constant definitions. The basic relationships for example include all occurrences of:

file defines {function, variable, type, constant};

function calls function;

file uses {file, variable, type, constant}

Similarly, the DFA file is a file generated for each source file which contains a record for each construct which uses non-global entities.

Figure 5:
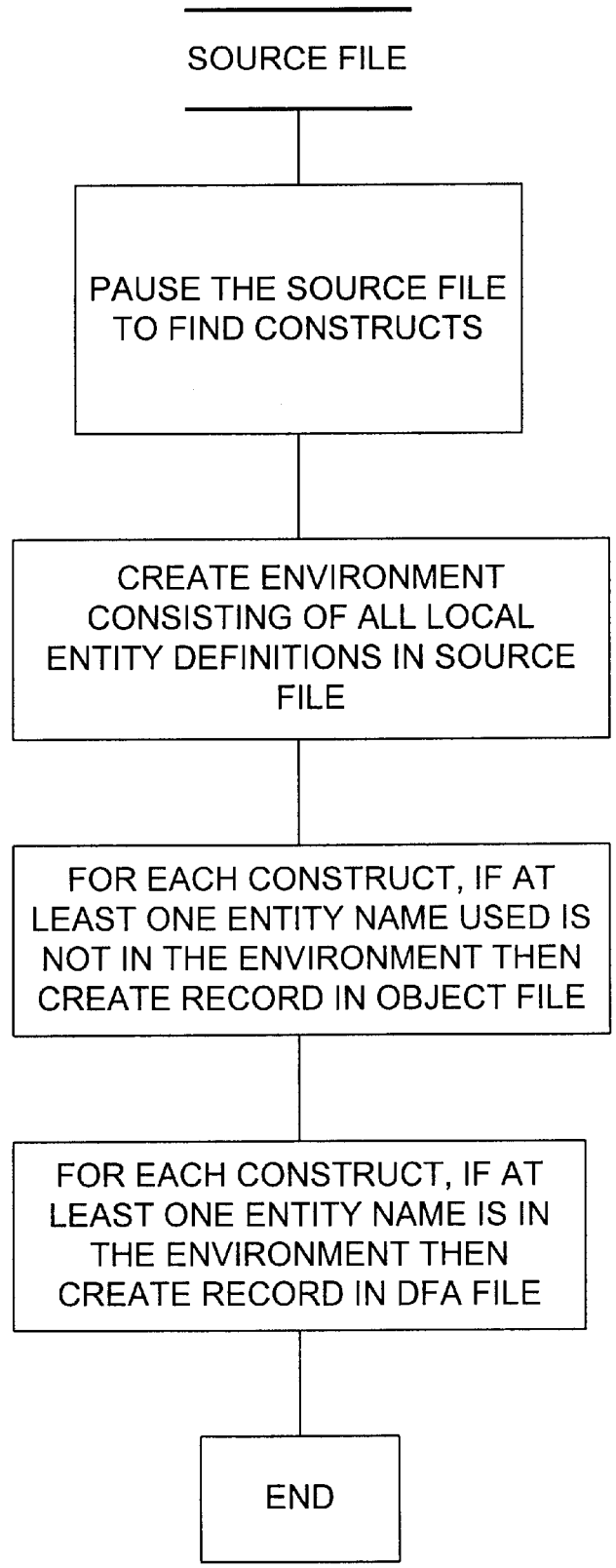
FIG. 5 is a flowchart for the step "Create Object Files and DFA Files" appearing in FIG. 4.

Referring now to FIG. 5, the steps taken to create an object file and a DFA file for a given source file will be described, these steps being performed for each source file. Firstly, the source file is parsed to find all constructs, a construct being a statement in a source file including data definitions, function definitions, block statements, assignment statements, procedure call statements, conditional statements etc. Parsing is well known in the art and will not be described further. Next, an "environment" is created for that source file consisting of all local entities defined in the source file. This may for example be created by determining all local definitions within each block in the source file to be the "scope" of that block, and then by combining all of the scopes as the environment. The contents of the scope distinguish between local and non-local entities with local entities being included and non-local entities not being included. The contents of the environment distinguish between global and non-global entities with non-global entities being included and global entities not being included. Each construct is checked to determine if it uses any global entity(s). This is done by checking for each entity used to see if it is in the environment. If not, then the entity is assumed global. For each construct using at least one global entity, a record in the object file is created. Finally for each construct which uses at least one non-global entity, a record in the DFA file is created.

Each record in the object file created in step one is preferably categorized in the object file during the creation of the object file by basic entity type for basic entity objects, and by basic relationship type for basic relationship objects. Thus, for the example given above, the object file will include the following categories:

file definitions;

variable definitions;

type definitions;

function definitions;

constant definitions;

function calls function;

file uses function;

function uses variable;

function uses type; and function uses constant.

Each entry in the object file also preferably includes information which permits the identification of where the respective basic code entity or basic relationship appeared in the source code. For example, for the "function calls function" category of basic relationship, each record preferably contains a symbolic name (or other identifier) of the calling function, a symbolic name (or other identifier) of the called function, one or more fields which identify part of the source code repository where the function call occurs, and a line number where the function call appears in the source code within a source file. The fields which identify the part of the source code repository where the function call occurs are dependent upon the manner in which source code is grouped in the source code repository. This is discussed in greater detail later.

Each entry in the DFA file is similarly categorized and contains similar information.

Step Two: Create Indirect Messaging Table

Assuming the above discussed categorization is performed in the creation of the object files and DFA files in step one, then all constructs of the form "function calls function" have already been identified. The indirect messaging table consists of an identification of a subset of the function calls function constructs which are "interface function calls".

Before being able to perform this step, a set of function calls which are considered interface function calls must be defined. Information identifying interface function calls and several of their important characteristics are stored in a file which will be referred to as an IDF (interface description file). The IDF is an input to step two.

The IDF contains a definition of each type of interface function or indirect messaging interface which is to be captured. A preferred format for records in the IDF and two examples of such records are shown in Table 1.

TABLE 1

| IDF Record Format and Example IDF Records | | |
|---|---|---|
| IDF field Name | Example IDF Record 1 | Example IDF Record 2 |
| Function Name | q_send | q_receive |
| Function Type | "s" | "r" |
| Type of service | queue | queue |
| Position of COID within function call | 1 | 1 |

The fields in the IDF record include a function name field, a function type field, a type of service field, and a "position of COID within function call" field. The function name field contains the symbolic name of an interface function as it would appear in source code. The function type is either "c" for create, "r" for receive, "s" for send, or "o" for other. There may be many different functions relating to receiving for example, and all of these would have the same function type, namely "r". The interface function, when called, contains one or more parameters at least one of which is a communications object having a COID (communications object identifier) of a certain type. The COID is a global entity symbolic name which either directly identifies the communications object appearing in the function call, or which identifies a global entity ultimately associated with the communications object appearing in the function call. The "type of service" identifies the particular messaging service/paradigm being used for the particular communication. For operating systems that support the C language, for example the pSOS operating system environment, these message types include signal, queue, event, semaphore. The "position of COID within function call" identifies where the global entity having that COID is located within the one or more parameters of the function call. There will be a different IDF for each software language and operating system. For a given software language and operating system, there will be a number of standard entries in the IDF. In addition, there may be a number of entries which relate to interface capabilities provided by application specific messaging paradigms implemented by application software used in conjunction with the OS. For example, it may be that the certain software entities in the source code are designed to communicate with each other (when compiled, linked and run etc.) through a database application. In this case, the first entity writes to the database, and the second entity reads from the database. Assuming this type of relationship between the first and second entities is of interest, entries for these database read and write functions are included in the IDF. Example IDF record 1 pertains to the C function "q_send" which has function type "s" f and has message type "queue". Example IDF record 2 pertains to the C function "q_receive" which has function type "r" and has message type "queue."

Sender interface functions, namely interface functions which are assigned interface function type "s" include any functions which do something with "write" permission to a communications object. These include write functions, modify functions, delete functions to name a few examples.

Receive interface functions, namely interface functions which are assigned interface function type "r" include any functions which do something with "read" permission on the basis of a communications object. These include read and receive functions for example.

Figure 6:
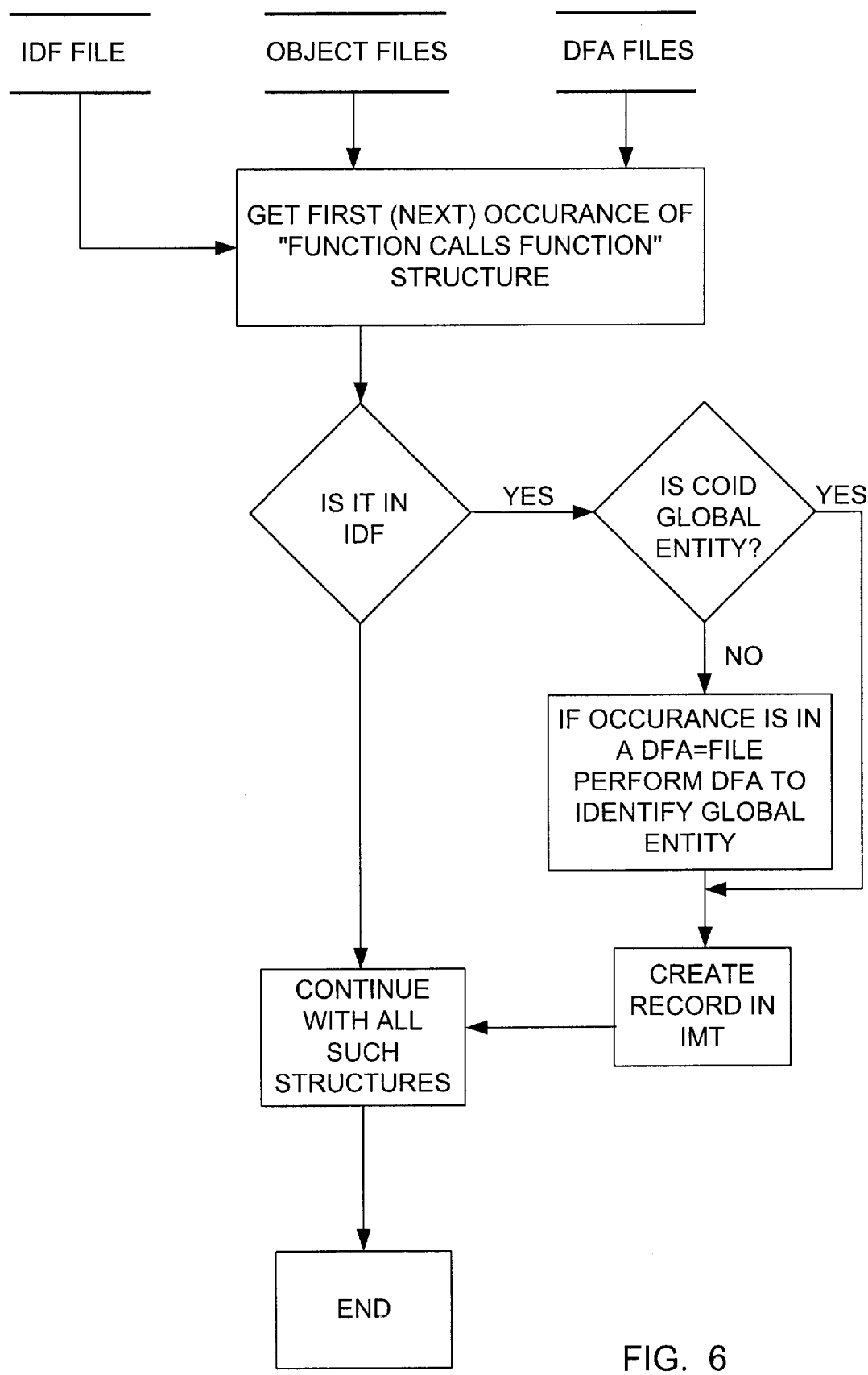
FIG. 6 is a flowchart for the step "Create Indirect Messaging Table" appearing in FIG. 4.

In step two, each record in the set of records in the object files and the DFA files pertaining to "function calls function" construct is examined to see if the called function is any one of the functions included in the IDF. A flowchart for this step is shown in FIG. 6.

As identified previously, the indirect messaging table is a table in which is stored all occurrences of functions calling interface functions. A preferred format for records in the indirect messaging table and two examples of such records are shown in Table 2. Example record A is an example of a record which uses the interface function defined in example IDF record 1 of Table 1, and example record B is an example of a record which uses the interface function defined in example IDF record 2 of Table 1. As was the case for the format of basic relationships in the object file, the format of the records in the indirect messaging table will be partially dependent upon how software entities are grouped within the software depository. In the examples of Table 2, it is assumed that interface functions are called from functions contained in files.

TABLE 2

Indirect Messaging Table Record Format and Example

| Field Name | Example Record A | Example Record B |
|---|---|---|
| File Name | file_A | file_B |
| Function where called | Func_A | Func_B |
| Interface Function Name | q_send | q_receive |
| Communications Object Identifier | GV1 | GV1 |
| line number | 100 | 200 |
| Type of service | queue | queue |
| Function Type {c,r,s,o} | s | r |

The fields in the indirect messaging table record include the name of the interface function being called, the function within which the interface function is called, and the file containing that function. The interface function name field must be one of the functions identified in the "function name" field of a record in the IDF. The "position of the COID within function call" is obtained from the field of the same name in the relevant record of the IDF and the global entity name directly or ultimately associated with the object in the object position within the function call identified by the "position of COID within function call" field is placed in the "Communications Object Identifier" field. The line number identifying where the interface function was called is included in the "line number" field. Finally, the "type of service" and function type fields of the indirect messaging record contain the "type of service" and "function type" copied from the fields of the same names in the relevant record of the IDF.

For constructs in the object files, if the entity in the "position of COID within function call" is non-global, then DFA may be performed to identify the global entity or entities ultimately associated with the non-global entity, with a record or records then generated on the basis of any such non-global entities identified. Alternatively, the record can be discarded with the understanding that it will be picked up when processing a DFA file record containing the same construct. The latter approach is preferred as it avoids duplicate records in the IMT which must be identified and eliminated. In what follows, the latter approach is assumed.

For the example parameters appearing in the table, the interface function calls in the source code might look like the following:

q_send(GV1,x,y,z) for example contents A; and q_receive(GV1,b,c) for example contents B.

For records in the DFA file, if the entity in the "position of COID within function call" is global, then a record in the IMT will have been created while processing a related object file record and the DFA record may be discarded.

For records in the DFA file which have non-global entities in the field identified by the "position of COID within function call", DFA is performed to identify one or more global entities which are ultimately associated with the entity in that position. A record in the indirect messaging table is created for each such global entity identified, these records taking the same form as those described with reference to Table 2 above. DFA in this context is the process of tracking local entity usage back to its global source(s). Techniques for performing DFA to achieve such ends are well known in the art and will not be described further herein.

Step Three: Identify Pairs of Records and Create Indirect Messaging Relationships Table In this step, the indirect messaging table is examined for pairs of records which together constitute a relationship. A relationship exists when one function is using a "send" type interface function with respect to a particular communications object, and another function is using a "receive" type interface function with respect to the same communications object. A table defined as an "Indirect Messaging Relationships Table" is created and is used to store a record for each such relationship. These records are categorized according to the particular message type.

An example record format for the C message type "queue" is shown in Table 3. A relationship having the "queue" message type would be identified for the two example indirect messaging table records of Table 2 because record A is a "send" type interface function (has type "s"), record B is a "receive" type interface function (has type "r"), and they both relate to the communications object GV1. Table 3 contains an example of an indirect messaging relationships record contents pertaining to the records of Table 2.

TABLE 3

Indirect Messaging Relationships Table Record Format for C Queue Messaqe Type and Example

| | |
|---|---|
| file_sender | file_A |
| func_sender | Func_A |
| sender_line_no | 100 |
| file_receiver | file_B |
| func_receiver | Func_B |
| receiver_line_no | 200 |
| COID | GV1 |

Of course, since most of the contents of the indirect messaging relationships table are already present in the indirect messaging table, a more concise version of the indirect messaging relationships table may be realized by simply including in each record a record ID together with pointers to the send and receive records in the indirect messaging table.

Figure 7:
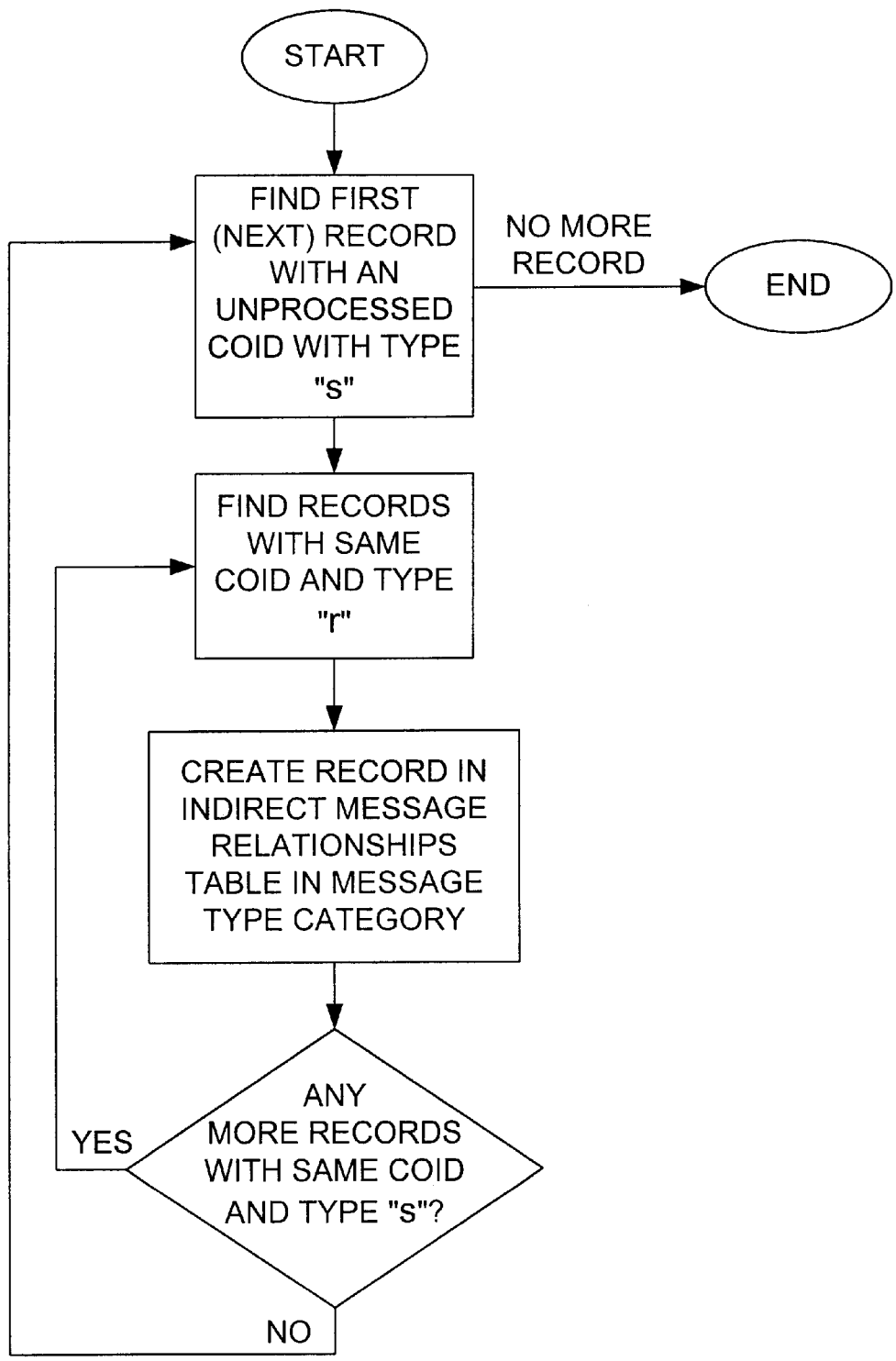
FIG. 7 is a flowchart for the step "Create Indirect Messaging Relationships Table" appearing in FIG. 4.

A flowchart for a method of identifying indirect messaging relationships is shown in FIG. 7. Firstly, the records in the indirect messaging table are examined in sequence for the first (next) record having an unprocessed COID and having type "s". Next, the remaining records are examined for any records having the same COID and having a function type "r". For each such record, an entry in the indirect messaging relationships table is created. After all of the records have been examined, the entire process is repeated for the next and all subsequent unprocessed COIDs having type "s". While a very specific method of identifying indirect messaging relationships from the indirect messaging table records has been described, it is to be understood that other methods may be employed within the scope of the invention.

Notes on Interface Functions Using Local Variables

In the above described embodiment of the RDT, it was assumed that in some cases, local variables were used in interface function calls to identify communications objects.

Consider the following example in which it is assumed that q_receive is an "r" type interface function, q_send is an "s" type interface function, local_1 is a local variable, Q1, Q2 are global variables, and RF,RF1,RF2,SF are functions defined as follows:

| | |
|---|---|
| RF | { q_receive(local_1) } |
| RF1 | { RF(Q) } |
| RF2 | { RF(Q1) } |
| SF | { q_send (Q1) } |

In this example, there is a relationship between the functions SF and RF2 because SF is a send function for Q1 and RF1 is indirectly a receive function for Q1.

In some circumstances, omitting such relationships may not pose a problem. This is because identifying relationships which directly use global entities will in most cases identify a large percentage of relationships. As such, it is contemplated that if the complex relationships are not of interest, then the creation and processing of the DFA files, and the DFA processing of local entity names within records in the object file are not necessary. However, in the event that these relationships are also to be captured, an interface function call containing a local variable located where a communications object identified by a global variable symbolic name would otherwise be expected, may be supplemented by a list of global variables whose values the local variable may be assigned using the above referenced DFA techniques. In the above example, the local variable local_1 may be assigned the values Q, as in the function RF1, or Q1, as in the function RF2, and as such the list {Q,Q1} is associated with the local variable local_1. This list is preferably generated automatically. In some cases, it may be necessary to follow the local variable through several function calls before finding the global variable(s) it actually represents. For the purposes of the creation of the indirect messaging table, a separate record would then be created for each possible global variable listed in association with the local variable.

Figure 8A:
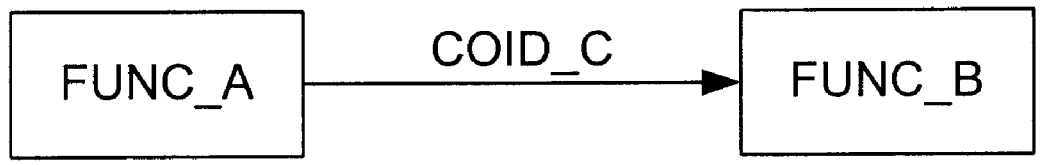
FIGS. 8A–8C are graphical representations of example indirect messaging relationships.
Figure 8B:
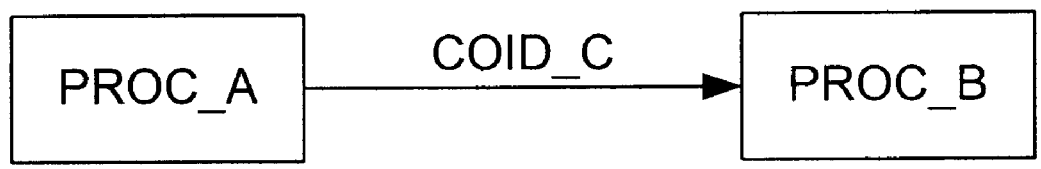
Figure 8C:
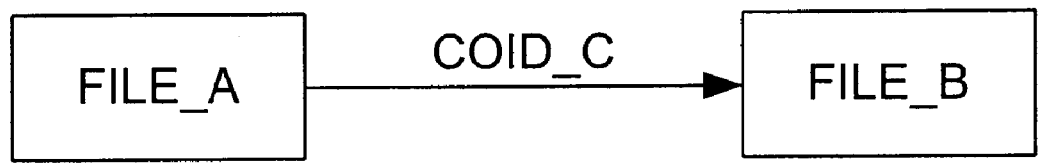
Figure 10A:
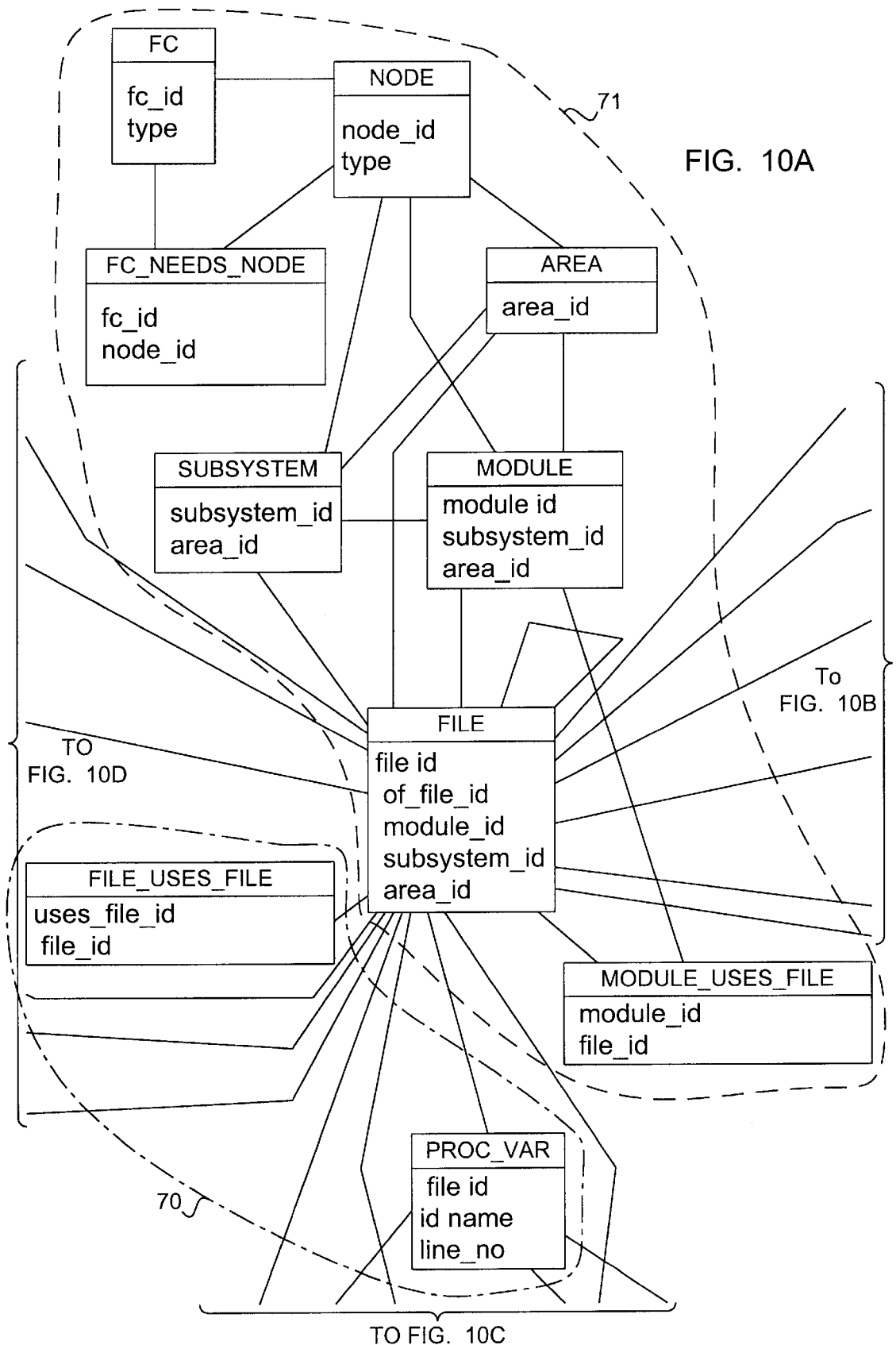
FIG. 10 is a database schema for the database of FIG. 3 in conjunction with source code written in the "C" language in a pSOS operating system environment.
Figure 10B:
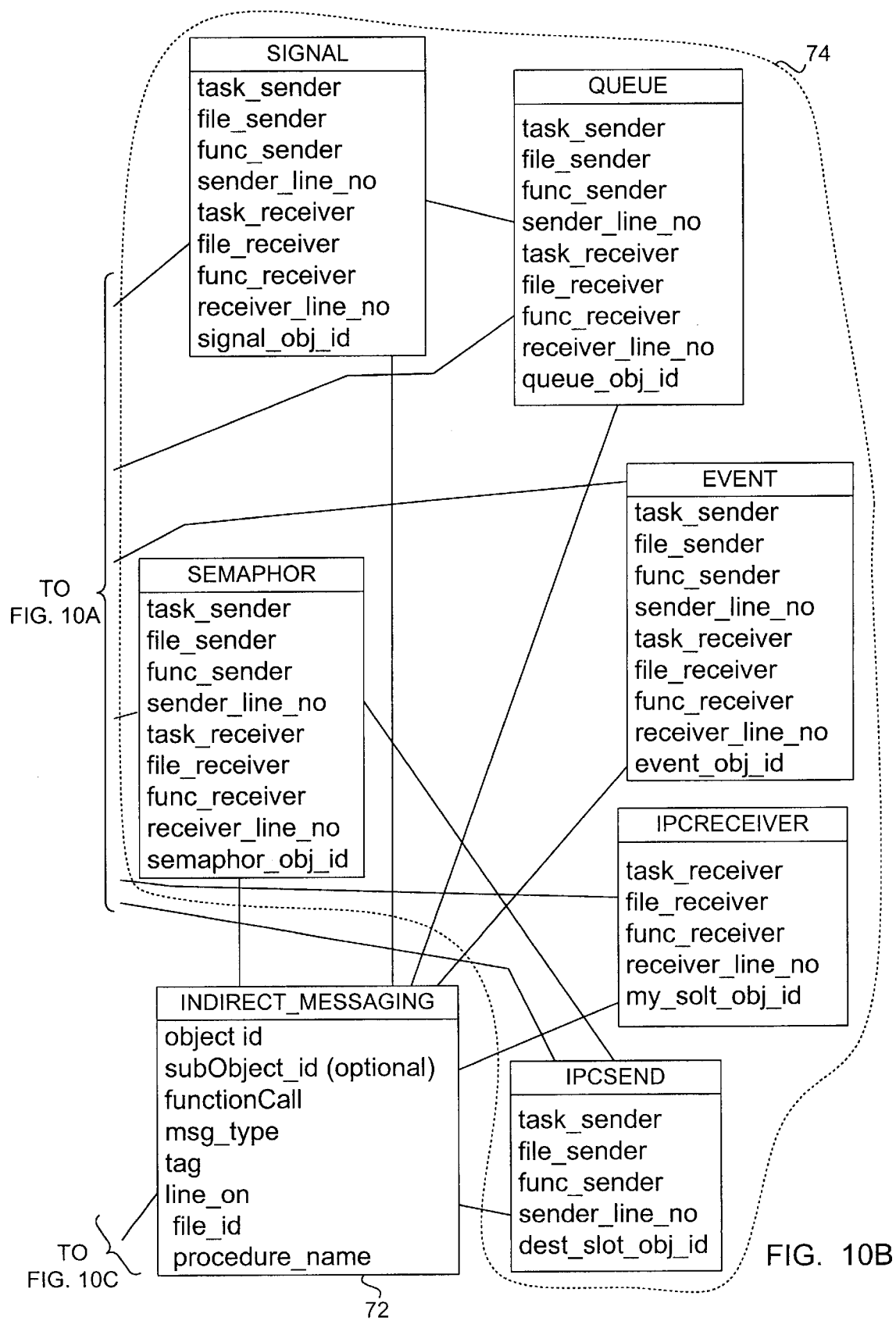
Figure 10C:
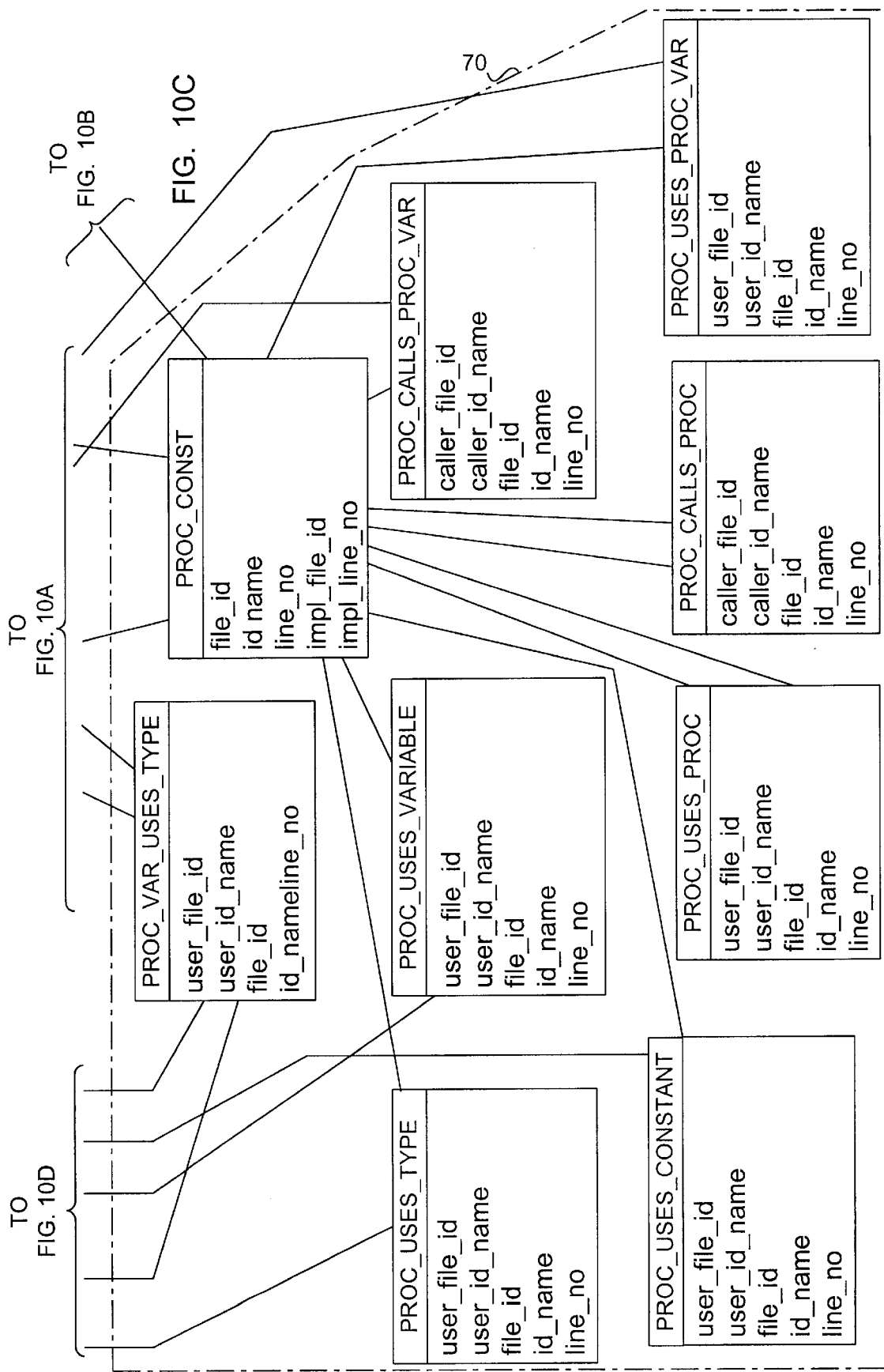
Figure 10D:
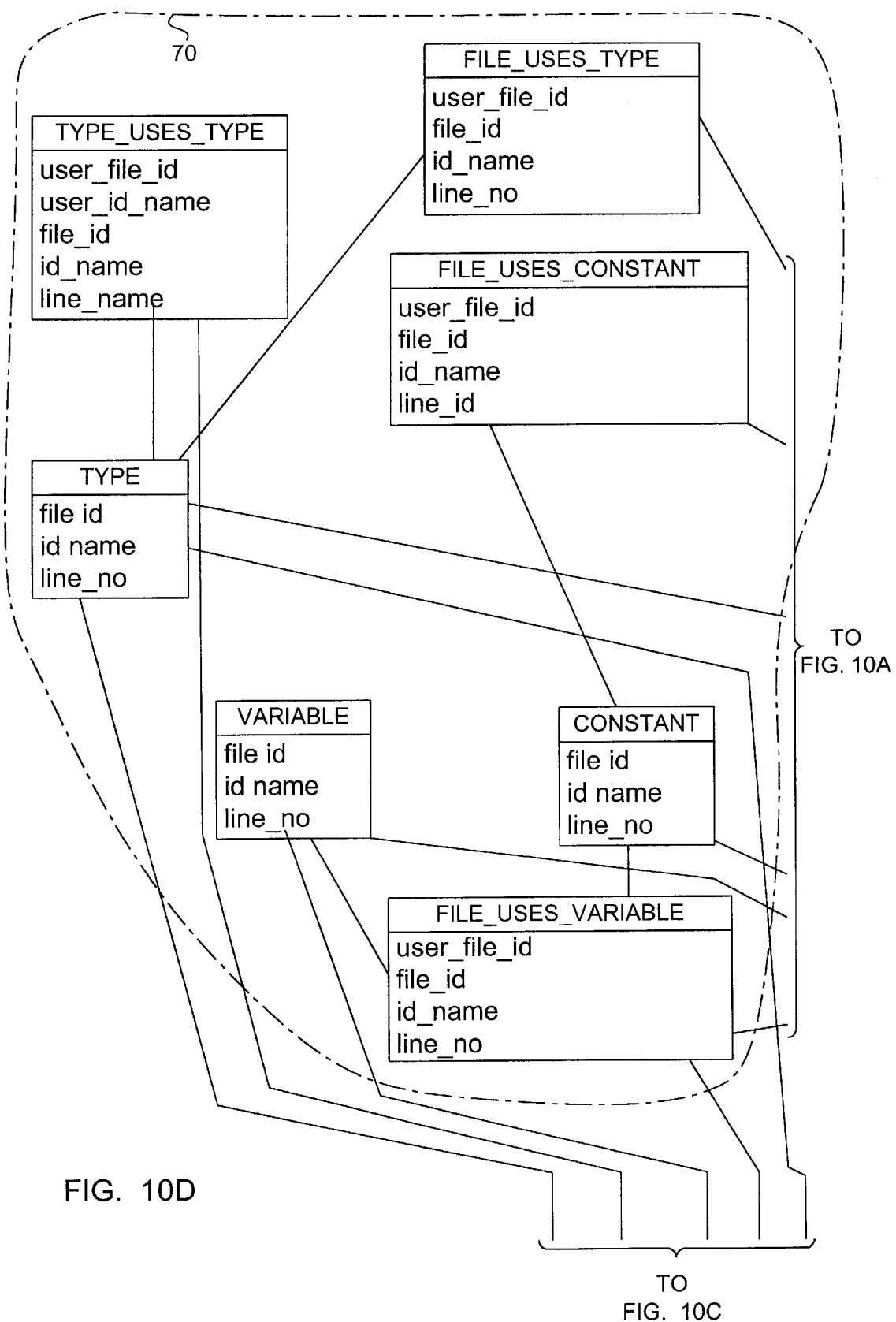

In the above described example it has been assumed that the source code consists of files which contain procedures which contain functions. This is shown diagramatically in FIG. 3 where a file 20 is shown to contain a procedure 22 which contains a function 24. Using the system and method provided by the invention on this example, a particular relationship will identify a sender interface function by a particular function containing the sender interface function call, a particular procedure containing the particular function, and a particular file containing the particular procedure. These may be referred to as the send function, the send procedure, and the send file respectively. Similarly, the receive interface function will be identified in the relationship by a particular function containing the receive interface function, a particular procedure containing the particular function, and a particular file containing the particular procedure. These may be referred to as the receive function, the receive procedure, and the receive file respectively. Such a relationship is very rich in information. It identifies a messaging relationship between the send function and the receive function. It also identifies a messaging relationship between the send procedure and the receive procedure. Finally, it identifies a messaging relationships between the send file and the receive file. Thus, for the example in Table 3, relationships may be identified between Func_A and Func_B, between Proc_A and Proc_B, and between File_A and File_B. These three types of relationships are illustrated in FIGS. 8A–8C respectively.

More generally, it is to be understood that depending upon the nature of the source code contained in the source code repository, functions may be grouped in many different ways on many different levels. At the very bottom level, there will always be some software entity which contains a call to a "send" interface function and another software entity which contains a call to a "receive" interface function. These software entities may be referred to as "Level 1" entities (and in the above described example these are functions containing interface function calls). Groups of level 1 entities may be arbitrarily combined to form "Level 2" entities (and in the above described example these are procedures). Groups of Level 2 entities may be arbitrarily combined to form "Level 3" entities (and in the above described example these are files). Any number N of levels may be defined, and generally, entities may be categorized from Level 1 to Level N. These levels and their contents may be manually defined for a particular source code repository for the purposes of the RDT, and/or may exist due to the structure of the source code repository. The methods and systems provided by the invention identify basic indirect messaging relationships between Level 1 entities which inherently identify relationships between higher level entities. The relationships do not even need to involve entities on the same level. For example, it might be of interest to determine all Level 2 entities which interact with a particular Level 3 entity (in the above level example definitions, this would involve determining all procedures which interact with a particular file). The structure of the basic indirect messaging relationships identified permits such a determination to be made with a simple database query.

Furthermore, it is to be understood that these levels may include logical groupings such as defined in a library code repository for example, when present. By associating all logical and physical levels/groupings with each interface function call, it is possible to identify relationships between physical entities, between logical entities, or between physical and logical entities.

An example of an IDF for the "C" language is given in FIG. 9. In this example, the first twenty-seven entries 60 are specific to the OS (pSOS) language, and the remaining two entries 62 are application based entries. An example database schema for the "C" language is shown in FIG. 10. The database schema shows elements 70 for the basic code entities and the basic relationship entities which are generated during the step of generating the object file and elements 71 for library entities and relationships. The schema also includes an element 72 for the indirect messaging table. Finally, the schema includes elements 74 for the indirect messaging relationships table, one for each possible type of messaging.

All constructs could be stored in a single file (the object for example) with DFA being conditionally performed if the object in the COID position is a non-global entity.

Furthermore, the object files and DFA files are convenient ways of organizing constructs. In another embodiment, the interface function calls may be searched for directly in the source code files in which case the object files and DFA files are not required.

Numerous modifications and variations of the present invention are possible in light of the above teachings. It is therefore to be understood that within the scope of the appended claims, the invention may be practised otherwise than as specifically described herein.

The embodiments of the invention in which an exclusive property or privilege is claimed are defined as follows:

1. An apparatus comprising:

means for reading source code files;

memory means for storing an indirect messaging table and indirect messaging relationships table;

means for performing reverse engineering on the source code files comprising:

means for identifying all constructs within the source code which are interface function calls and storing each of these in a record in the indirect messaging table, and including in each record a respective communications object identifier used in the respective interface function call; and means for identifying all pairs of records in the indirect messaging table consisting of a first record relating to a "send" type interface function call and a second record relating to a "receive" type interface function call with both the first and second records containing the same communications object identifier and storing for each pair a record in the indirect messaging relationships table.

2. A method to be performed on or with the aid of one or more processors comprising the steps of:

performing software reverse engineering on source code to identify indirect messaging relationships between software containment entities in the source code by:

searching for all constructs within the source code which are interface function calls and storing each of these in a record in an indirect messaging table, each record also comprising a respective communications object identifier used in the respective interface function call, and an identifier of a respective software containment entity within which the respective construct appears;

searching for all pairs of records in the indirect messaging table consisting of a first record relating to a "send" type interface function call and a second record relating to a "receive's" type interface function call with both the first and second records containing the same communications object identifier;

whereby each such pair of records provides an identification of an indirect messaging relationship between the software containment entity in the first record and the software containment entity in the second record.

3. A method according to claim 2 wherein the step of searching for the constructs comprises the steps of:

generating an object file(s) from the source code comprising all basic code objects and all basic relationship objects appearing in the source code;

searching for all basic relationship objects in the object file(s) which are interface function calls.

4. A method according to claim 3 wherein a record in the object file is only created for a given construct if the construct uses at least one global entity.

5. A method according to claim 4 wherein said step of searching for the constructs further comprises the steps of:

generating a DFA file(s) from the source code comprising basic code objects and basic relationship objects appearing in the source code which relate to constructs using at least one non-global entity;

searching for all basic relationship objects in the DFA file(s) which are interface function calls;

for each interface function call found, determining if the interface function call uses a non-global entity in a predetermined position within the interface function call, and if so, identifying a global entity ultimately associated with the non-global entity and using this as the communications object identifier.

6. A method according to claim 5 wherein said step of identifying a global entity ultimately associated with the non-global entity is performed using data flow analysis.

7. A method according to claim 3 further comprising the step of determining if the construct uses a non-global entity in a predetermined position within the construct, and if so, identifying a global entity ultimately associated with the non-global entity and using this as the communications object identifier.

8. A method according to claim 7 wherein said step of identifying a global entity ultimately associated with the non-global entity is performed using data flow analysis.

9. A method according to claim 3 wherein said step of searching for all basic relationship objects in the object file which are interface function calls comprises the steps of:

searching for all basic relationship objects which are functions calling functions;

searching for the interface function calls from within the objects found as being functions calling functions.

10. A method according to claim 3 wherein said step of searching for all basic relationship objects in the object file which are interface function calls comprises the steps of:

i) searching for all basic relationship objects which comprise a calling function calling another function;

ii) determining a basic relationship object found in step i) to be an interface function call if the calling function is one of a predefined set of interface functions.

11. A method according to claim 10 wherein each of said predefined set of interface functions has associated with it a position identifier which identifies where a communications object identifier would appear in a call using the respective interface function and wherein the particular communications object identifier stored in the indirect messaging table for each interface function call is a symbolic name appearing in the position identified by the associated position identifier.

12. A method according to claim 2 further comprising the step of storing in each record in the indirect messaging table an indication of whether the record pertains to a "send" type interface function or a "receive" type interface function.

13. A method according to claim 2 further comprising the step of storing in each record in the indirect messaging table fields identifying physical software entities which hierarchically contain the respective interface function call.

14. A method according to claim 13 further comprising the step of storing in each record in the indirect messaging table fields identifying logical containment of the respective interface function call.

* * * * *